United States Patent [19]
Schmidt

[11] Patent Number: 4,923,167
[45] Date of Patent: May 8, 1990

[54] SLIDE VALVE WITH DOSAGE REGULATION MEANS

[76] Inventor: Alfred Schmidt, Burgstrasse 11, Pottenstein, Fed. Rep. of Germany, 8573

[21] Appl. No.: 288,757

[22] Filed: Dec. 21, 1988

[30] Foreign Application Priority Data

Dec. 22, 1987 [DE] Fed. Rep. of Germany ....... 3743569

[51] Int. Cl.⁵ .................. F16D 63/00; F15B 13/04; F02D 9/06
[52] U.S. Cl. .............................. 251/25; 123/323; 137/625.68; 188/273; 251/205; 251/325; 251/900
[58] Field of Search .................. 123/323; 188/273; 137/625.68; 251/120, 205, 325, 900, 25

[56] References Cited
U.S. PATENT DOCUMENTS

| | | | |
|---|---|---|---|
| 3,138,175 | 6/1964 | Chilcoat | 251/205 X |
| 3,987,999 | 10/1976 | Savage | 251/205 |
| 4,111,166 | 9/1978 | Alstrin et al. | 188/273 X |
| 4,705,069 | 11/1987 | Fertig | 137/625.68 X |

FOREIGN PATENT DOCUMENTS

| | | |
|---|---|---|
| 2324187 | 6/1974 | Fed. Rep. of Germany . |
| 3430028 | 2/1986 | Fed. Rep. of Germany . |
| 3533393 | 3/1987 | Fed. Rep. of Germany . |
| 2519436 | 7/1983 | France .......................... 137/625.68 |

*Primary Examiner*—Gerald A. Michalsky
*Attorney, Agent, or Firm*—Fleit, Jacobson, Cohn, Price, Holman & Stern

[57] ABSTRACT

A slide valve for fluid wherein a slide (3) is axially reciprocally movable in a housing chamber (2) of a valve housing (1). A housing channel (7) in the valve housing (1), which housing channel communicates with a first external connection (8), is provided with a recess (16) directed toward the slide (3) and the piston (3) has a slide channel (14) which communicates with a second external connection (11) via a further recess (15). The slide valve is designed such that passage of fluid does not become blocked by impurities in the fluid, and the slide valve is capable of fine-variability. This is achieved in that the upstream recess (16) has a cross-section which narrows in the direction of the slide valve axis toward the housing channel (7) when the slide (3) is in the closed position. In order to achieve finely variable dosage regulation by the slide valve, the upstream recess (16) has variable cross-section, as the slide (3) is moved in the housing chamber (2).

20 Claims, 2 Drawing Sheets

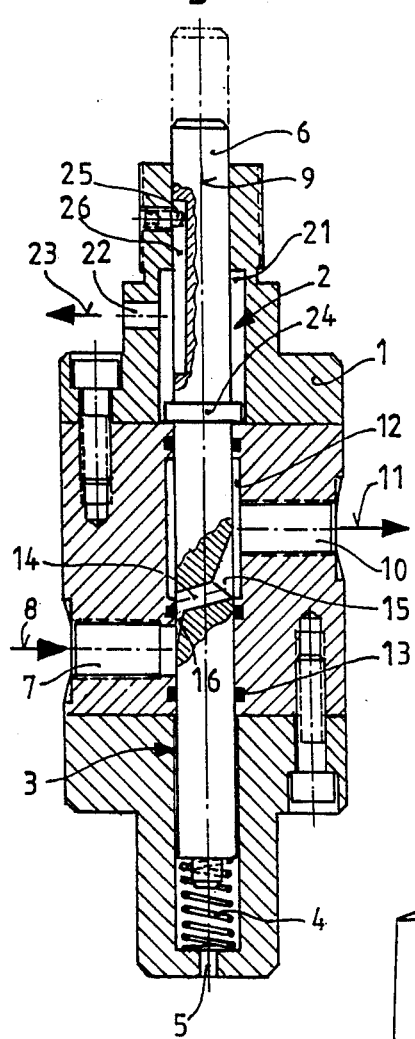
Fig.1
Fig.2
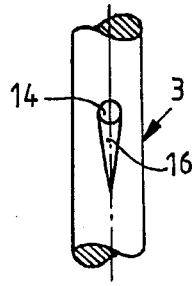
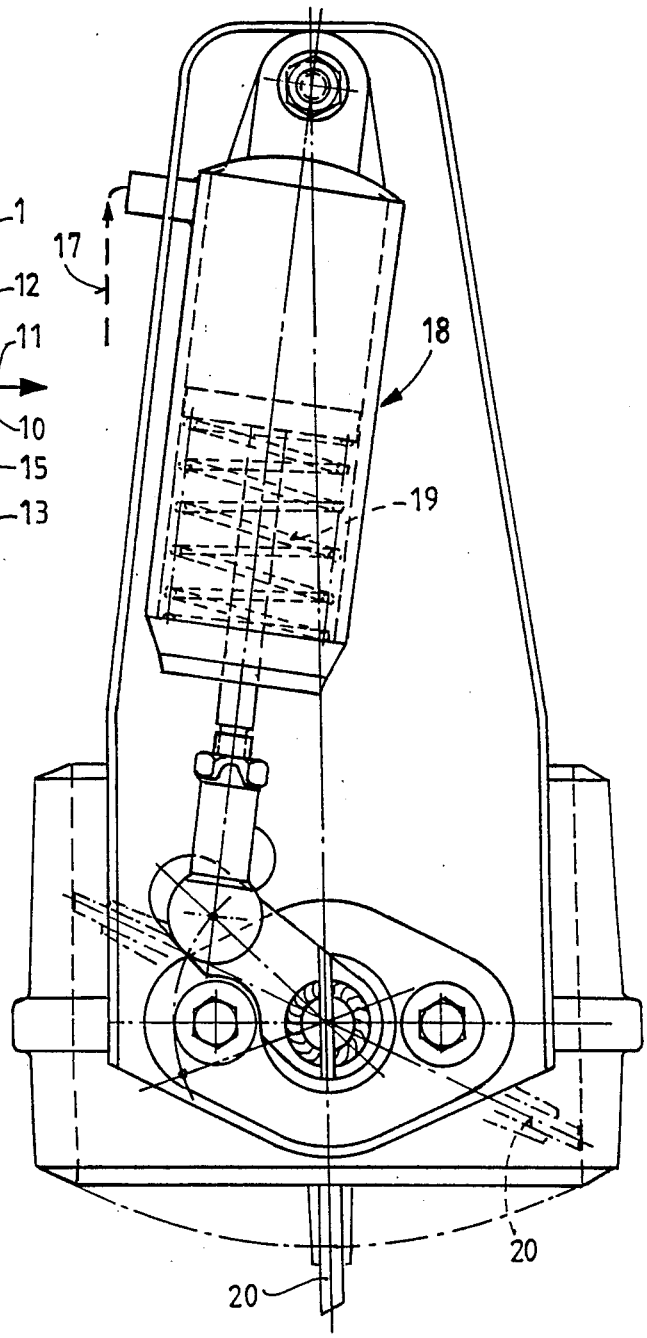
Fig.3

Fig. 4
Fig. 5
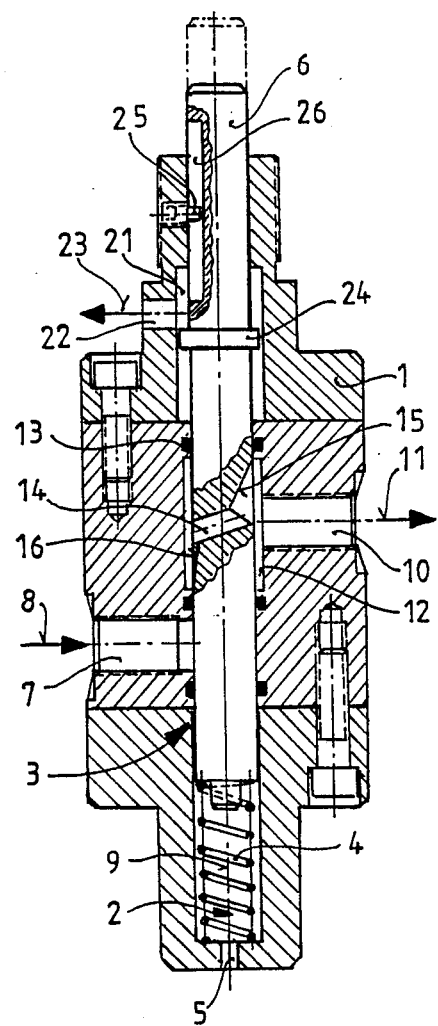
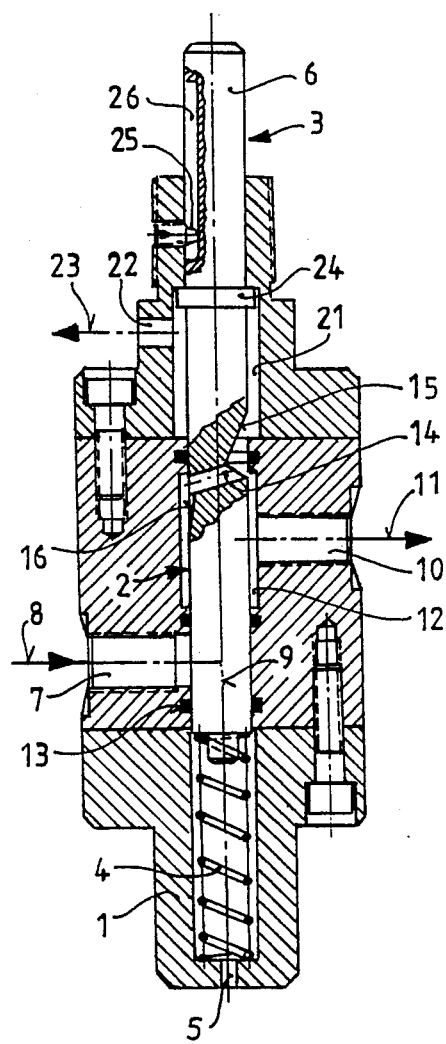

SLIDE VALVE WITH DOSAGE REGULATION MEANS

BACKGROUND OF THE INVENTION

The invention relates to a slide valve with dosage regulation means for a fluid wherein a slide member is axially reciprocally movable in a housing chamber of a valve housing.

In a known slide valve of this type (Ger. AS No. 23 24 187), the upstream housing channel has a plurality of holes extending only above the slide channel, which slide channel itself is comprised of a plurality of bores. The dosage regulation brought about by displacement of the slide therefore occurs only when the downstream and upstream housing channels are brought more or less into accurate alignment, whereby the fluid can exhaust after flowing through the region in which the two housing channels are aligned. This dosage regulation means provides little fine variability, taking into account the available translational movement of the slide. The fine-variability can be improved by reducing the cross-sections of the holes, however this introduces an additional risk of blockage of the holes by impurities in the fluid.

SUMMARY OF THE INVENTION

Accordingly, the object of the invention is to provide a slide valve of the type wherein blockage of the holes by impurities in the fluid does not occur, and wherein there are provided finely variable dosage regulation means. The inventive slide valve which solves this problem is characterized in that the upstream slide channel opening is a varying cross-section recess which narrows with axial progression of the slide towards its closed position.

A housing channel in the valve housing communicates with a first external connection and also communicates with a slide channel in the slide via a slide channel opening. The other end of the slide channel has another slide channel opening which communicates with a second external connection via a further housing channel in the valve housing. The fluid is fed to the slide channel via one of the housing channels and is withdrawn from the slide channel via the other of the housing channels. Furthermore, seal means are provided on both sides of the upstream housing channel.

To provide means of dosage regulation in the inventive slide valve, not only is the overlapping region of the two housing channels offset, but the cross-section available for outflow of the fluid after it passes through the overlapping region is changed by moving the slide. The cross-section is smaller under conditions of overlapping relating to the recess than the cross-section of the outlet-side channel, and, in the course of opening of the slide valve, the cross-section increases gradually from zero to a substantial value. There are no constant small cross-sections as in the case of the small holes of the prior art, accordingly, impurities will not accumulate and create blockage in the recess. As long as the overlapping region of the two housing channels occurs in the region of the recess, the dosage regulation will have good fine-variability characteristics. Further, the edges of the recess will not damage the seal, or will cause only negligible damage to the seals as these edges slide when the slide is moved back and forth between the closed and open positions.

The upstream housing channel and associated recess may optionally be provided in the valve housing itself. However, it is particularly advantageous if the recess which is associated with the upstream housing channel is in the slide, because this location facilitates fabrication of the recess structure.

If the upstream housing channel is formed by a ring of generally radial holes arrayed around the center axis of the slide valve, the recess may be in the form of an encircling groove the radial depth of which diminishes with axial distance away from the holes. Such a recess configuration enables a relatively large flow of fluid. It is particularly advantageous, however, if the upstream housing channel is in the form of a unitary cavity and, along with the recess, is limited to a part of the circumference around the center axis of the valve. Under this arrangement, even the maximum passage cross-section under conditions of overlap of the passage openings is kept small.

It is further particularly advantageous if the upstream housing channel comprises a bore, and the circumferential width generally along the circumference of the slide of the above-described recess is equal to or less than the corresponding circumferential width of the bore. This configuration relating to the recess improves the fine-variability of the dosage regulation, and in general is the preferred configuration if there is only one upstream housing channel in the form of a bore.

The recess associated with the upstream housing channel bore is in the form of, e.g. a slot, the width of which is variable with radial or axial progression with respect to the slide axis. However, it is particularly advantageous if the base of the recess is planar and is disposed angularly with respect to the center axis of the slide valve, and if the recess narrows in width with progression axially. Such a recess structure is easy to fabricate, particularly if the recess is located at the exterior surface of the slide. Because this recess varies both in its width in the circumferential direction and in its depth in the radial direction there is a substantial improvement in fine-variability of the dosage regulation, in addition to easier fabrication of the recess structure. The recess can be produced directly by grinding rather than with use of a cutting technique. Its axial extent is as a rule more than twice its width in the circumferential direction.

It is particularly advantageous if the angle between the base of the recess and the center axis of the slide valve is 1°-2°, and if the recess has a maximum depth of 0.2-0.4 mm, an axial length of 9.5-13.5 mm, and a maximum width of 3-5 mm. These dimensions are for the preferred application of the slide valve mentioned below. It is further particularly advantageous if the edges of the recess which are closest to the seals are polished so as to present less hazard to the seals.

It is also particularly advantageous if the seal across which the recess moves is comprised of an O-ring. This O-ring, which will be subjected to compression and tension provides a good means of dealing with such stresses which are created when the recess moves across the seal.

It is particularly advantageous if the position of the recess in the circumferential direction is reliably maintained by radial means whereby the valve housing engages the slide. It is important to have such means of maintaining the proper orientation of the upstream openings relative to the upstream openings in the circumferential direction.

As an option, it is possible to continue the slide channel beyond the slide in the axial direction. It is particularly advantageous, however, if when the slide is in its "open" position the slide channel terminates in a cavity in the valve housing, which cavity is bounded by the slide, wherewith an additional connection is provided from the cavity to the external connection. This improves and facilitates the exhaust or inflow of fluid from or to the slide channel.

The invention also includes a slide valve of the type described initially above, which valve is characterized in that, when the slide is in a "closed" position in the sense that fluid cannot pass between the two external connections (or "relief" position), one of the two external connections is connected to an outlet by means of a recess in the slide. The slide valve is essentially a two-way valve, whereby, e.g., the external connection through which the fluid is fed is connected to the outlet, or, more typically, the external connection through which the fluid is exhausted is connected with the outlet. The latter arrangement is of particular practical value in controlling the position of component parts which are subject to a third force, e.g. a mechanical spring, which tends to restore the position of the components parts against the force of the fluid.

It is particularly advantageous if the recess extends across an encircling seal. Even if the slide is frequently operated, its recess does not damage the seals when the slide is moved axially back and forth. Damage is particularly avoided if the seal comprises an O-ring which is compressed and pre-stressed.

The inventive slide valve described herein can be used generally where fine-variability of dosage regulation is desired. However, it is particularly advantageous to use the slide valve to control the position of a spring-loaded apparatus by means of pressurized gas. The position of such apparatus can be sensitively controlled in a finely variable fashion between two terminal positions. This arrangement generally requires no pressure reducing valve employing a membrane, which type of valve has the drawback of not providing sufficiently reliable uniform characteristics at any justifiable cost level. A small change in position of the apparatus can be achieved by a small displacing movement of the subject slide.

The invention additionally consists of the use of the above-described inventive slide valve for controlling the position of a spring-loaded butterfly valve employed as a throttle in a static pressure exhaust-type engine brake. Such exhaust-operated brakes are per se known (see Ger. OSs No. 34 30 028 and 35 33 393). Heretofore, such brakes have been operated in a manner wherein the throttle valve was either fully closed or fully open; whereas according to the present invention the throttle valve can be adjusted to any position between, and including, fully closed and fully open.

In static pressure exhaust-type engine brakes the pressurized air which is to be controlled has not been cleaned and therefore is capable of blocking narrow passages. In long-term tests it has been found infeasible to employ membrane-type pressure reducing valves to achieve fine variable control of the position of the butterfly valve throttle. Known dosage regulating valves (see Ger. ASs No. 23 24 187 and 17 25 040) cannot be successfully used in connection with static pressure exhaust-type engine brakes because of inadequate fineness of adjustability. A butterfly valve throttle which can only adopt a fully open or fully closed position is hazardous when a slippery spot in the road is encountered. Therefore in the past, static pressure exhaust-type engine brakes have not been used where there are slippery roads. The invention provides a means of finely varying the setting of the butterfly valve disc, between and including a closed position and various degrees of open positions. A truck driver can close the butterfly valve throttle disc to varying degrees, by depressing a foot pedal with varying amounts of force. Regulation of the pressurized air in the slide valve employed as a control valve for the brake throttle is accomplished by, e.g., an angled surface on the controlling slide which surface leads to the opening of a flow path and continuously provides a bypass across the seals. When the butterfly throttle disc is closed to varying degrees, various corresponding braking forces are applied.

BRIEF DESCRIPTION OF THE DRAWINGS

A preferred embodiment of the invention will now be described with reference to the accompanying drawings wherein;

FIG. 1 is a cross-section of a slide valve with dosage regulation means in accordance with the invention, showing the valve in the open position;

FIG. 2 is an elevational view of a detail of the slide valve according to FIG. 1;

FIG. 3 is a side elevational view of a static pressure exhaust-type engine brake which can be actuated by the slide valve according to FIG. 1;

FIG. 4 is a view similar to FIG. 1 showing the slide valve in a closed position; and FIG. 5 is a view similar to FIG. 1 showing the slide valve in a relief position.

DETAILED DESCRIPTION

The slide valve according to the drawings has a valve housing 1 comprised of three housing pieces which are fastened together by screws. Housing 1 has an elongated axially extending housing chamber 2, the transverse cross-section of which varies along its length. An elongated piston or slide 3 which is fitted within the housing chamber 2 is reciprocally movable and one end is biased by a compression spring 4. The region of the housing chamber 2 in which spring 4 is located is connected to the external atmosphere via a vent hole 5. An upper actuating terminal end member 6 of the slide 3 extends upward out of the housing 1, and can be slid an arbitrary distance downwards into the housing 1 by means of an actuating member not shown, against the force of the spring 4.

The valve housing 1 has a first housing channel 7 to which pressurized air is supplied via a first external connection 8 (as per the arrow), and which channel 7 opens out into the housing chamber 2 via an opening. The cross-section of channel 7 is uniform over its length. A second housing channel 10 is provided on the opposite side to channel 7 with regard to the center axis 9. Housing channel 10 opens out into the housing chamber 2, and also has a cross-section which is uniform over its length. Pressurized air is passed out from channel 10 via a second external connection 11. In the region of housing chamber 2 from which the second housing channel 10 extends, the housing chamber 2 has an increased diameter, thereby forming a ring-shaped void, or annulus, 12 which surrounds the slide 3.

The diameter of the slide 3 is essentially uniform over its length. Seals 13 surround the slide 3 on both sides of housing channel 7. Each seal 13 is disposed in a groove in the internal periphery of the valve housing 1. The void 12 begins near one of the seals 13. An additional seal 13 extending generally circularly around the slide 3 is provided near the other end of void 12, which seal 13 is also disposed in an internal peripheral groove in the valve housing 1. A slide channel 14, generally having the shape of a cylindrical bore, extends through the slide 3 at an angle to the center axis 9. On its end nearest to the second housing channel 10, slide channel 14 has downstream slide channel opening 15 which represents an elongated recess in slide 3, having an increasing radial depth along the direction of center axis 9. The axial extent of downstream recess 15 is greater than that of housing channel 10. On the side of the slide 3 nearest the housing channel 7, the slide has an upstream slide channel opening 16 in the form of a recess whose cross-section decreases along the axial direction downwardly (as shown) and away from the slide channel 14 (see especially FIG. 2). The upstream recess 16, together with the slide channel 14, forms a passage opening. In the open position, illustrated in FIG. 1, pressurized air flows through the first external connection 8, the housing channel 7, the recess 16, the slide channel 14, the downstream recess 15, the void space 12, the second housing channel 10, and finally to the second external connection 11.

A connecting line 17 is connected to the second external connection 11 which line 17 leads to a piston-and-cylinder device 18 of a static pressure exhaust-type engine brake according to FIG. 3. In the cylinder, the pressurized air acts on a piston, the opposite end of which is acted on by a spring 19. When the piston moves, the piston rod rotates a disc-type butterfly valve 20 which serves as a throttle. The more compressed air that is forced into the cylinder, the more strongly the throttle valve 20 is closed; at the same time, spring 19 urges throttle valve 20 into the open position. In the open position of the slide valve illustrated in FIG. 1, the upstream recess 16 extends downwardly beyond the middle seal 13 and is not shut off by middle seal 13.

Slightly above the upper seal 13, there begins a second void 21 in the housing chamber, which void 21 is vented (see arrow 23) via a channel 22 in the valve housing, which channel 22 opens out from void 21. The slide 3 has a flange 24 in the region of void 21, whereby the reciprocating movement of the slide 3 is limited in both directions. A projection 25 is provided in the valve housing 1 in the region between the void 21 and the end member 6, which projection 25 extends into an axially extending groove 26 in the slide 3, thereby preventing rotation of the slide.

FIG. 4 shows the slide valve in its fully closed position, wherein the slide 3 is in its middle position. The slide channel 14, with upstream recess 16 and downstream broadened recess 15, is disposed between the middle seal 13 and the upper seal 13, so that pressurized air cannot flow in via external connection 8, and cannot flow out via external connection 11, or be exhausted via outlet 23.

FIG. 5 shows the slide valve in a relief position, with the slide 3 disposed in a position in which no force from spring 4 acts on the slide. The upstream recess 16 and the associated end of the slide channel 14 are disposed between the middle and the upper seals 13, so that no pressurized air can enter via the external connection 8. The downstream broadened recess 15 of the slide channel 14 extends across the upper seal 13, thereby connecting the two voids 12 and 21, so that pressurized air can pass through the external connection and outlet 23, if the throttle valve 20 (FIG. 3) is moved into its open position (seen in solid line valve 20) by spring 19.

What is claimed is:

1. Static pressure exhaust-type engine brake comprising:
    a butterfly valve means having open, closed and intermediate positions;
    a piston-cylinder means operatively connected to said butterfly valve means for closing said butterfly valve means upon actuation of said piston-cylinder means;
    spring means operatively connected to said piston-cylinder means for resiliently urging said butterfly valve means towards the open position thereof;
    fluid pressure inlet means connected to said piston-cylinder means for admitting pressurized fluid to actuate said piston-cylinder means to close said butterfly valve means against the force of said spring means;
    a slide valve having a housing;
    a chamber in said housing having a central axis;
    a slide element slidably mounted for reciprocating axial movement in said chamber between an open position, closed position, and relief position;
    an actuating terminal end on said slide element projecting out of said housing;
    an inlet channel in said housing having an inner end communicating with said chamber at a first position;
    an outlet channel in said housing having an inner end communicating with said chamber at a second position axially spaced from said first position;
    a bore hole slide channel in said slide member extending at an angle relative to said central axis and having an inlet end and an outlet end (for connecting said first position with said second position when said slide member is in said open position);
    an upstream control recess in the outer surface of said slide member at said inlet end of said slide channel for connecting said inlet end to said first position when said slide member is in said open position, and having a planar base extending at an angle relative to said central axis and a width that narrows in the axial direction from said inlet end toward said first position;
    a downstream recess in said slide element at said outlet end of said slide channel for connecting said outlet end to said second position when said slide element is in said open position;
    a first sealing ring mounted in said housing surrounding said slide element between said first and second positions for sealing between said slide element and said chamber; and
    a second sealing ring mounted in said housing surrounding said slide element for sealing between said slide element and said chamber on the opposite side of said first position from said second position;
    so that when said slide element is in said open position said upstream control recess overlaps said first sealing ring to a varying degree dependent upon a selective axial position of said slide element relative to said housing for controlling flow of pressurized fluid from said inlet channel to said outlet channel, and when said slide element is in said closed position said first sealing ring prevents said flow of pressurized fluid.

2. Static pressure exhaust-type engine brake as claimed in claim 1 wherein:
   a relief channel means is provided in said housing having an inner end communicating with said chamber at a third position axially spaced from said second position in the opposite direction to said first position;
   a third sealing ring is mounted in said housing surrounding said slide element between said second and third positions for sealing between said slide element and said chamber;
   said chamber further comprises an enlarged diameter section forming a cylindrical annular space surrounding said slide element between said first and third sealing rings for connecting with said upstream control recess and said downstream recess when said slide element is in said open position; and
   said downstream recess has a narrowing cross-section in the direction of said third sealing ring and overlaps said third sealing ring when said slide element is in said relief position for connecting said outlet channel through said cylindrical annular space to said relief channel means.

3. Static pressure exhaust-type engine brake as claimed in claim 2 wherein:
   said upstream control recess has a maximum circumferential width no greater than the circumferential width of said inlet end of said slide channel.

4. Static pressure exhaust-type engine brake as claimed in claim 3 and further comprising:
   cooperating means between said slide element and said housing for preventing relative rotation between said slide element and said housing.

5. Static pressure exhaust-type engine brake as claimed in claim 4 wherein said cooperating means comprises:
   an axially extending slot in the outer surface of said sliding element; and
   a projection substantially radially extending from said housing and slidingly engaging in said axial slot.

6. Static pressure exhaust-type engine brake as claimed in claim 5 wherein:
   said chamber further comprises a second cylindrical annular space surrounding said slide element between said third sealing ring and said third position and communicating with said relief channel means; and
   said downstream recess connects said cylindrical annular recesses when said slide element is in said relief position.

7. Static pressure exhaust-type engine brake as claimed in claim 6 and further comprising:
   a spring cavity at the end of said chamber adjacent the end of said sliding element opposite to said actuating terminal end of said sliding element; and
   a spring member in said spring cavity between said chamber and said opposite end of said sliding element for resiliently urging said sliding element towards said closed position.

8. Static pressure exhaust-type engine brake as claimed in claim 2 wherein:
   said chamber further comprises a second cylindrical annular space surrounding said slide element between said third sealing ring and said third position and communicating with said relief channel means; and
   said downstream recess connects said cylindrical annular recesses when said slide element is in said relief position.

9. Static pressure exhaust-type engine brake as claimed in claim 1 wherein:
   said upstream control recess has a maximum circumferential width no greater than the circumferential width of said inlet end of said slide channel.

10. Static pressure exhaust-type engine brake as claimed in claim 1 and further comprising:
    cooperating means between said slide element and said housing for preventing relative rotation between said slide element and said housing.

11. Static pressure exhaust-type engine brake as claimed in claim 10 wherein said cooperating means comprises:
    an axially extending slot in the outer surface of said sliding element; and
    a projection substantially radially extending from said housing and slidingly engaging in said axial slot.

12. Static pressure exhaust-type engine brake as claimed in claim 1 and further comprising:
    a spring cavity at the end of said chamber adjacent the end of said sliding element opposite to said actuating terminal end of said sliding element; and
    a spring member in said spring cavity between said chamber and said opposite end of said sliding element for resiliently urging said sliding element towards said closed position.

13. Static pressure exhaust-type engine brake as claimed in claim 1 wherein:
    said downstream recess has a narrowing cross-section in the axial direction away from said second sealing ring and an axial length greater than that of said inner end of said outlet channel.

14. Static pressure exhaust-type engine brake as claimed in claim 1 wherein:
    said downstream recess has an axial length greater than that of said inner end of said outlet channel.

15. Static pressure exhaust-type engine brake as claimed in claim 1 wherein:
    said angle of said planar base of said upstream control recess relative to said central axis comprises 1° to 2°; and
    said upstream control recess has a maximum depth in the range of 0.2 mm to 0.4 mm, an axial length in the range of 9.5 mm to 13.5 mm, and a maximum width in the range of 3 mm to 5 mm.

16. A variable flow slide valve comprising:
    a housing;
    a chamber in said housing having a central axis;
    a slide element slidably mounted for reciprocating axial movement in said chamber between an open position, closed position, and relief position;
    an actuating terminal end on said slide element projecting out of said housing;
    an inlet channel in said housing having an inner end communicating with said chamber at a first position;
    an outlet channel in said housing having an inner end communicating with said chamber at a second position axially spaced from said first position;
    a bore hole slide channel in said slide member extending at an angle relative to said central axis and having an inlet end and an outlet end;
    an upstream control recess in the outer surface of said slide member at said inlet end of said slide channel for connecting said inlet end to said first position when said slide member is in said open position and having a planar base extending at an angle relative to said central axis and a width that narrows in the axial direction from said inlet end toward said first position;

a downstream recess in said slide element at said outlet end of said slide channel for connecting said outlet end to said second position when said slide element is in said open position;

a first sealing ring mounted in said housing surrounding said slide element between said first and second positions for sealing between said slide element and said chamber; and a second sealing ring mounted in said housing surrounding said slide element for sealing between said slide element and said chamber on the opposite side of said first position from said second position;

so that when said slide element is in said open position said upstream control recess overlaps said first sealing ring to a varying degree dependent upon a selective axial position of said slide element relative to said housing for controlling flow of pressurized fluid from said inlet channel to said outlet channel, and when said slide element is in said closed position said first sealing ring prevents said flow of pressurized fluid.

17. A variable flow slide valve as claimed in claim 16 wherein:

a relief channel means is provided in said housing having an inner end communicating with said chamber at a third position axially spaced from said second position in the opposite direction to said first position;

a third sealing ring is mounted in said housing surrounding said slide element between said second and third positions for sealing between said slide element and said chamber;

said chamber further comprises an enlarged diameter section forming a cylindrical annular space surrounding said slide element between said first and third sealing rings for connecting with said upstream control recess and said downstream recess when said slide element is in said open position; and said downstream recess has a narrowing cross-section in the direction of said third sealing ring and overlaps said third sealing ring when said slide element is in said relief position for connecting said outlet channel through said cylindrical annular space to said relief channel means.

18. A variable flow slide valve as claimed in claim 17 wherein:

said chamber further comprises a second cylindrical annular space surrounding said slide element between said third sealing ring and said third position and communicating with said relief channel means; and said downstream recess connects said cylindrical annular recesses when said slide element is in said relief position.

19. A variable flow slide valve as claimed in claim 16 wherein:

said downstream recess has a narrowing cross-section in the axial direction away from said second sealing ring and an axial length greater than that of said inner end of said outlet channel.

20. A variable flow slide valve as claimed in claim 16 wherein:

said downstream recess has an axial length greater than that of said inner end of said outlet channel.

* * * * *